United States Patent
Fang et al.

(10) Patent No.: US 11,420,273 B2
(45) Date of Patent: Aug. 23, 2022

(54) ROTARY CUTTING TOOLS AND APPLICATIONS THEREOF

(71) Applicant: Kennametal Inc., Latrobe, PA (US)

(72) Inventors: Xiangdong D. Fang, Greensburg, PA (US); Paul D. Prichard, Greensburg, PA (US); Kevin M. Gamble, Latrobe, PA (US); David Wills, Latrobe, PA (US); Jeff Lane, Latrobe, PA (US)

(73) Assignee: KENNAMETAL INC., Latrobe, PA (US)

( * ) Notice: Subject to any disclaimer, the term of this patent is extended or adjusted under 35 U.S.C. 154(b) by 0 days.

(21) Appl. No.: 16/655,803

(22) Filed: Oct. 17, 2019

(65) Prior Publication Data

US 2021/0114123 A1    Apr. 22, 2021

(51) Int. Cl.
*B23C 5/28* (2006.01)
*B23C 5/10* (2006.01)
*B23Q 11/10* (2006.01)

(52) U.S. Cl.
CPC .................. *B23C 5/28* (2013.01); *B23C 5/10* (2013.01); *B23C 2250/12* (2013.01); *B23Q 11/1023* (2013.01); *Y10T 409/304032* (2015.01)

(58) Field of Classification Search
CPC ..... B23C 5/28; B23C 2250/12; B23B 51/042; B23B 51/0486; B23B 51/06; B23B 27/10; B23Q 11/10; B23Q 11/1015; B23Q 11/1023; B23Q 11/1046; B23Q 11/1053; Y10T 409/303976; Y10T 409/304032
See application file for complete search history.

(56) References Cited

U.S. PATENT DOCUMENTS 3,037,264 A * 6/1962 Mossberg ................. B23C 5/28
  407/11
6,045,301 A * 4/2000 Kammermeier ........ B23B 51/06
  408/230

(Continued)

FOREIGN PATENT DOCUMENTS

CN    108188460 A    6/2018
CN    207824055 U    9/2018

(Continued)

OTHER PUBLICATIONS

English machine translation of DE 102019124223 (Year: 2019).*
Aug. 7, 2021 Office Action (non-US) DE App. No. 102020126731.

*Primary Examiner* — Alan Snyder
(74) *Attorney, Agent, or Firm* — Christopher J. Owens

(57) ABSTRACT

In one aspect, rotary cutting tools are described herein comprising sets of coolant channels having exit aperture in the flutes of the tools for efficient coolant delivery to multiple cutting surfaces. Briefly, a rotary cutting tool comprises a shank portion, and a cutting portion extending from the shank portion along a longitudinal axis, the cutting portion comprising flutes helically extending along the longitudinal axis and internal coolant channels comprising exit apertures in the flutes. A projection of an exit aperture of a first set of internal coolant channels intersects a rake face extending below a corner edge of the rotary cutting tool, and a projection of an exit aperture of a second set of internal coolant channels intersects a rake face below a radial cutting edge of the rotary cutting tool.

24 Claims, 7 Drawing Sheets

(56) References Cited

U.S. PATENT DOCUMENTS

| | | | |
|---|---|---|---|
| 2003/0223831 A1* | 12/2003 | Viens | B23C 5/006 408/60 |
| 2007/0283786 A1* | 12/2007 | Kappmeyer | B23B 27/10 76/101.1 |
| 2012/0082524 A1* | 4/2012 | Matsuda | B23B 51/06 408/59 |
| 2015/0298221 A1* | 10/2015 | Ach | B23B 51/06 407/11 |
| 2015/0360302 A1* | 12/2015 | Guter | B23B 51/06 408/59 |
| 2016/0031016 A1* | 2/2016 | Takai | B23B 51/02 408/57 |
| 2016/0214187 A1* | 7/2016 | Fukata | B23C 5/28 |
| 2016/0263666 A1* | 9/2016 | Myers | B23C 5/10 |
| 2016/0332236 A1 | 11/2016 | Stoyanov | |
| 2019/0134723 A1* | 5/2019 | Mueller | B23P 15/28 |

FOREIGN PATENT DOCUMENTS

| | | | |
|---|---|---|---|
| DE | 10348061 A1 * | 5/2005 | B23D 77/006 |
| DE | 102016103818 A1 | 9/2016 | |
| DE | 102015106374 A1 | 10/2016 | |
| DE | 102018126753 A1 | 6/2020 | |
| DE | 102019124223 A1 | 3/2021 | |
| WO | WO2013021856 A1 | 2/2013 | |
| WO | WO2018162185 A1 | 9/2018 | |

* cited by examiner

ROTARY CUTTING TOOLS AND APPLICATIONS THEREOF

FIELD

The present invention relates to rotary cutting tools and, in particular, to rotary cutting tools comprising coolant channels having coolant exit apertures along axial portions of the rotary cutting tools.

FIELD

End mills are rotary tools that are used for machining many types of materials, from metals to plastics. They are supported by a shank which is generally cylindrical and adapted to be removably gripped by a motor driven chuck or functionally similar device. The shank graduates into a cutting portion on a single end mill or into two cutting portions on a double end end mill. The cutting portion extends to an end of the end mill. The cutting portion has a plurality of cutting blades which are separated by flutes for carrying away the chips which are generated by the cutting operation. The cutting blades and the flutes may be parallel to the end mill's longitudinal axis, but more often are helical. The cutting portion typically terminates with radial cutting features designed to complement the cutting action provided by the axial portions of the cutting blades.

End mills and other rotary cutting tools are generally operated at high cutting temperatures in the cutting zone. High cutting temperatures are beneficial because they can cause the material that is being cut to flow more easily, thus increasing metal removal rates and lowering the amount of force required to cut the material. However, high cutting temperatures and thermal cycling can fatigue the end mill, leading to a variety of failure mechanisms. In response, channels have been employed to deliver coolant to the end face of the end mill. In many cases, the coolant channels lack effective delivery of coolant to critical cutting surfaces. Moreover, current coolant channel designs often waste significant amounts of coolant, thereby increasing machining costs.

SUMMARY

In one aspect, rotary cutting tools are described herein comprising sets of coolant channels having exit apertures in the flutes of the tools for efficient coolant delivery to multiple cutting surfaces. Briefly, a rotary cutting tool comprises a shank portion, and a cutting portion extending from the shank portion along a longitudinal axis, the cutting portion comprising flutes helically extending along the longitudinal axis and internal coolant channels comprising exit apertures in the flutes. A projection of an exit aperture of a first set of internal coolant channels intersects a rake face extending below a corner edge of the rotary cutting tool, and a projection of an exit aperture of a second set of internal coolant channels intersects a rake face below a radial cutting edge of the rotary cutting tool. In some embodiments, the rotary cutting tool further comprises a third set of internal coolant channels having exit apertures in the flutes. A projection of an exit aperture of the third set of internal coolant channels is parallel or substantially parallel with the longitudinal axis.

In another aspect, methods of cutting a workpiece are described herein. In some embodiments, a method comprises providing a rotary cutting tool comprising a shank portion, and a cutting portion extending from the shank portion along a longitudinal axis, the cutting portion comprising flutes helically extending along the longitudinal axis and internal coolant channels comprising exit apertures in the flutes, and contacting the workpiece with the rotary cutting tool. Coolant is discharged from a first set of coolant channels to strike a rake face below a corner edge of the rotary cutting tool, and coolant is also discharged from a second set of internal coolant channels to strike a rake face below a radial cutting edge of the rotary cutting tool. In some embodiments, coolant is additionally discharged from a third set of internal coolant channels along the longitudinal axis of the rotary cutting tool.

These and other embodiments are described in further detail in the following detailed description.

DETAILED DESCRIPTION

Embodiments described herein can be understood more readily by reference to the following detailed description and examples and their previous and following descriptions. Elements, apparatus and methods described herein, however, are not limited to the specific embodiments presented in the detailed description and examples. It should be recognized that these embodiments are merely illustrative of the principles of the present invention. Numerous modifications and adaptations will be readily apparent to those of skill in the art without departing from the spirit and scope of the invention.

I. Rotary Cutting Tools

Figure 1:
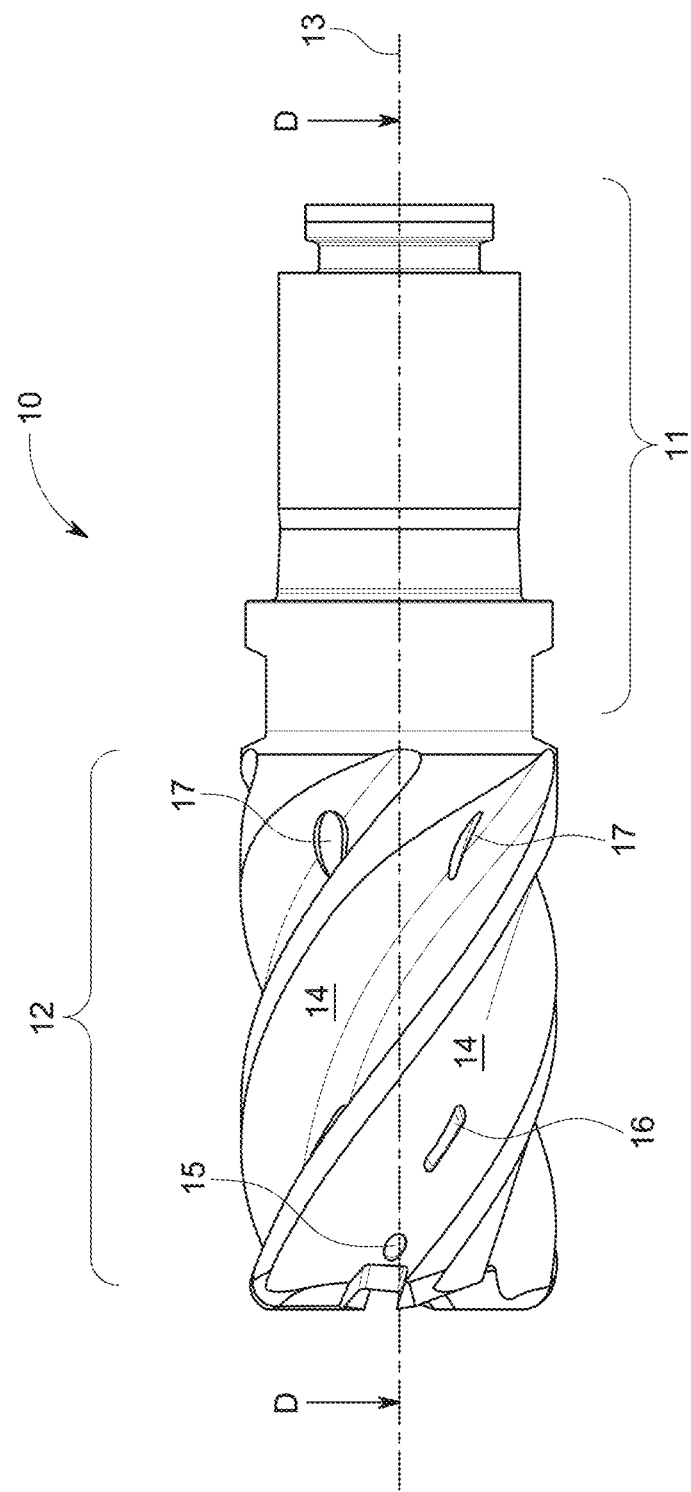
FIG. 1 illustrates a perspective view of a rotary cutting tool according to some embodiments described herein.
Figure 2:
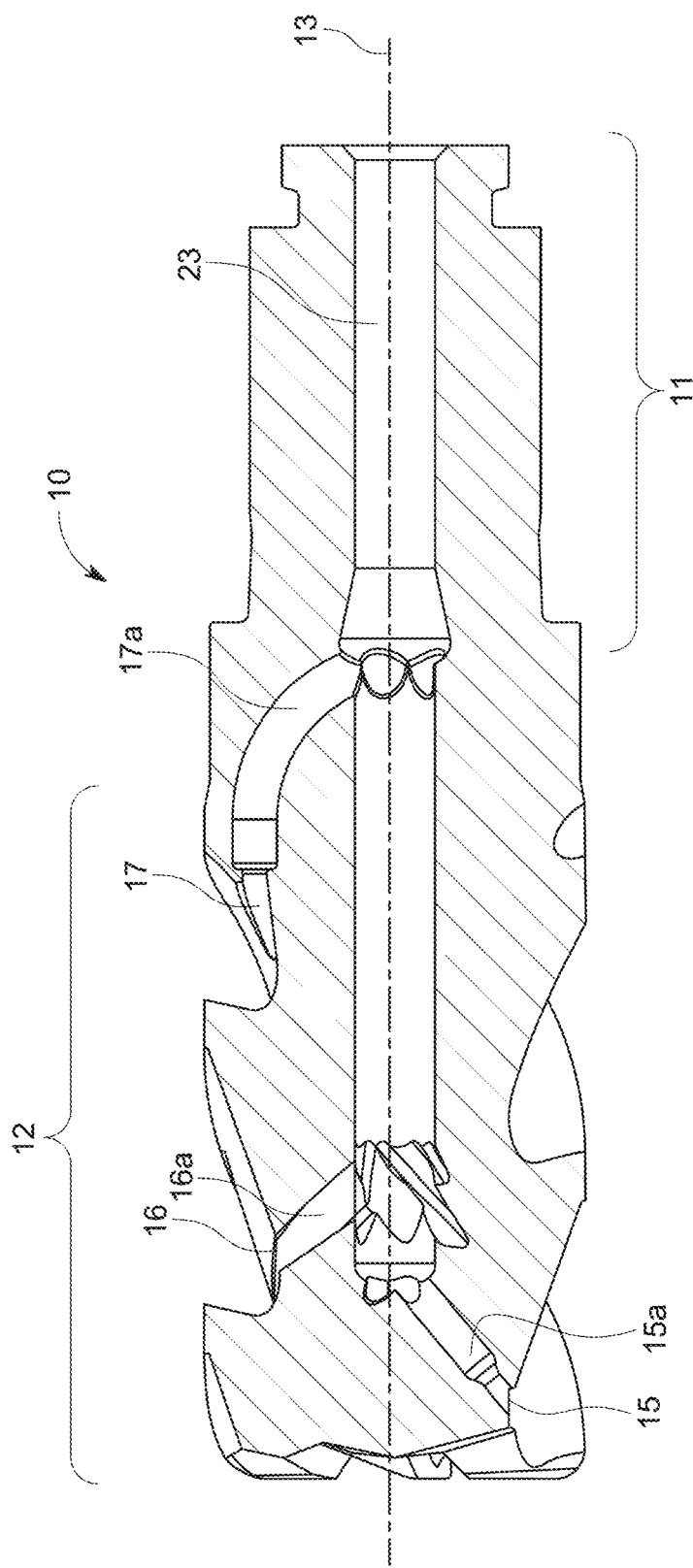
FIG. 2 is a cross-sectional view of the rotary cutting tool of FIG. 1.
Figure 3:
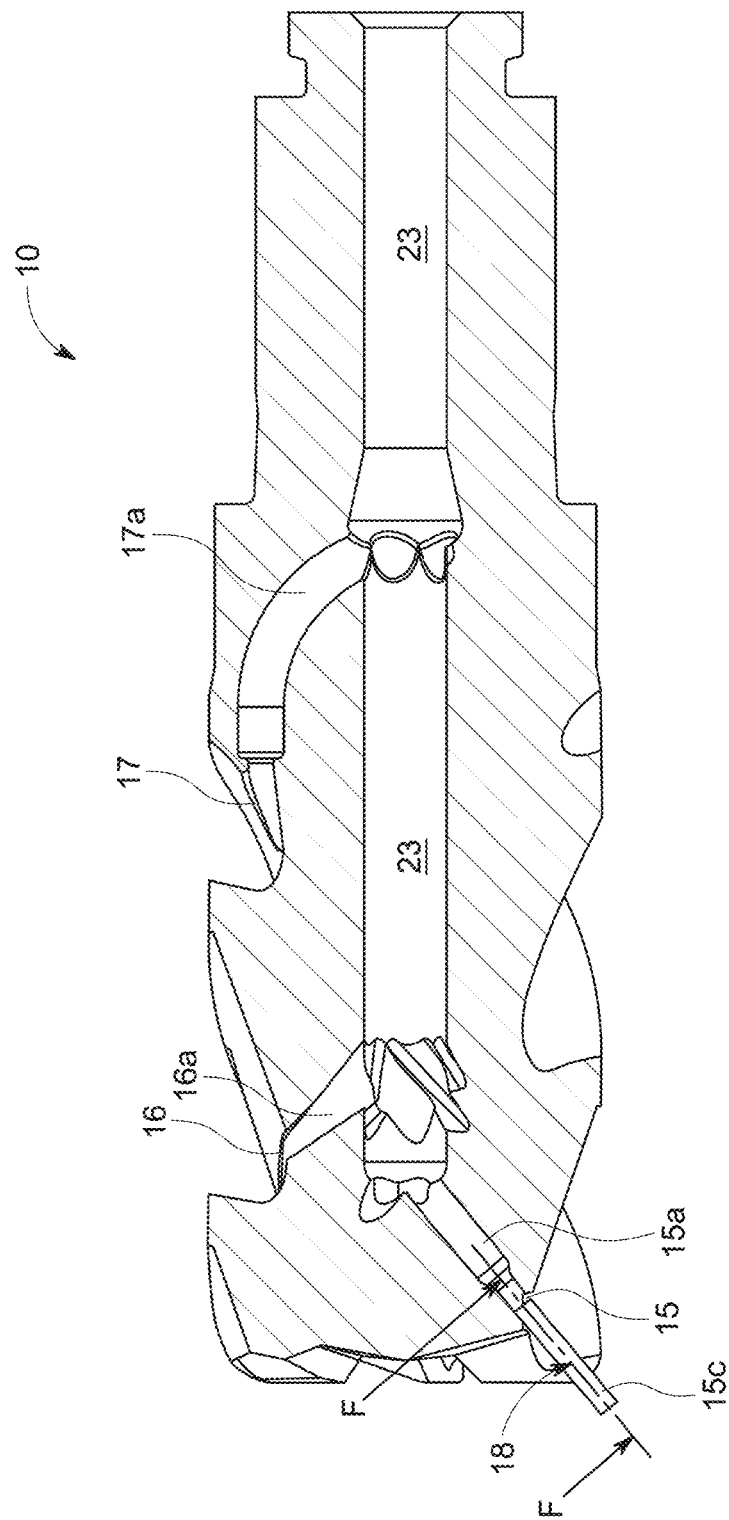
FIG. 3 illustrates a projection of an exit aperture of a first set of internal coolant channels intersecting a rake face extending below a corner edge of the rotary cutting tool according to some embodiments.
Figure 4A:
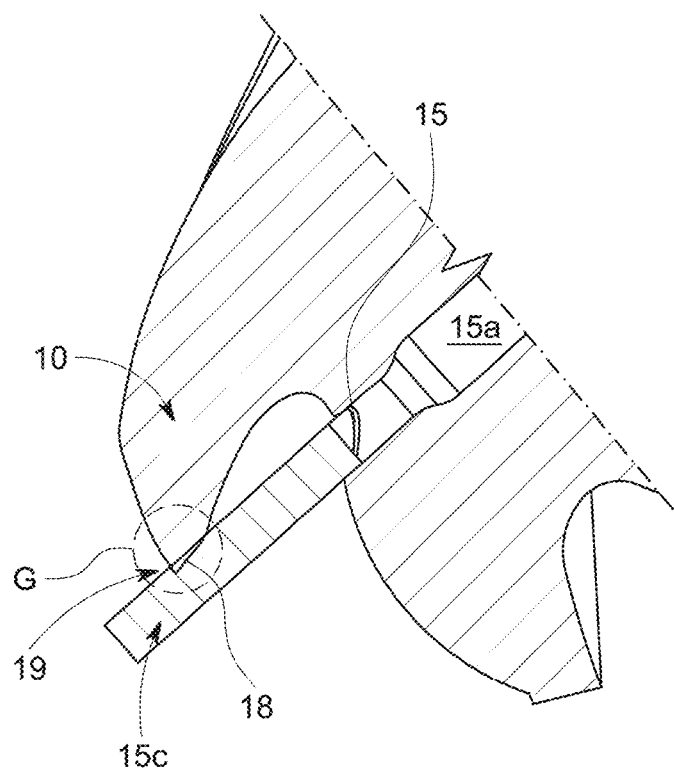
FIG. 4A is a cross-section taken along the F-F line of FIG. 3.
Figure 4B:
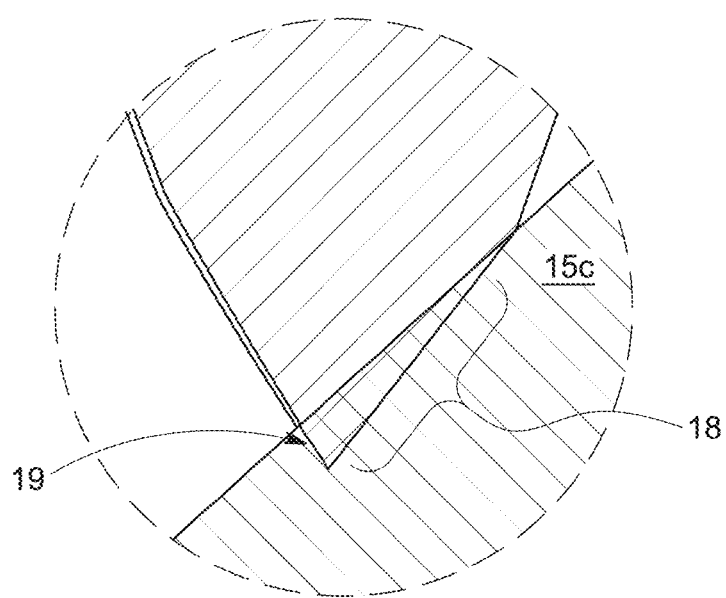
FIG. 4B magnifies the highlighted circular region of FIG. 4A, further illustrating the projection of an exit aperture of the first set of internal coolant channels intersecting a rake face extending below a corner edge according to some embodiments.

Referring now to FIG. 1, a rotary cutting tool 10 described herein comprises a shank portion 11 and a cutting portion 12 extending from the shank portion 11 along a longitudinal axis 13. The cutting portion 12 comprises flutes 14 helically extending along the longitudinal axis 13 and internal coolant channels comprising exit apertures 15, 16, 17 in the flutes 14. FIG. 2 is a cross-sectional view of the rotary cutting tool of FIG. 1. A first set of internal coolant channels 15a are associated with exit apertures 15 proximate the end face of the rotary cutting tool 10. A projection 15c of an exit aperture 15 of the first set of internal coolant channels 15a intersects a rake face 18 extending below a corner edge 19 of the rotary cutting tool 10. As described further herein, a projection of an exit aperture is an image of the exit aperture extending along an axis normal to the cross-section of the exit aperture. FIG. 3 illustrates the projection 15c intersecting a rake face 18 extending below a corner edge of the rotary cutting tool 10. As illustrated in FIG. 3, the projection 15c is an image of the exit aperture 15 extending along an axis 15d normal to the cross-section of the exit aperture 15. FIG. 4A is a cross-section taken along the F-F line of FIG. 3 further illustrating the projection 15c intersecting the rake face 18 extending below the corner edge 19. FIG. 4B magnifies the highlighted circular region of FIG. 4A. In some embodiments, each exit aperture 15 of the first set of internal coolant channels 15a has the projection 15c intersecting a rake face 18 extending below a corner edge 19 of the rotary cutting tool 10.

Figure 5:
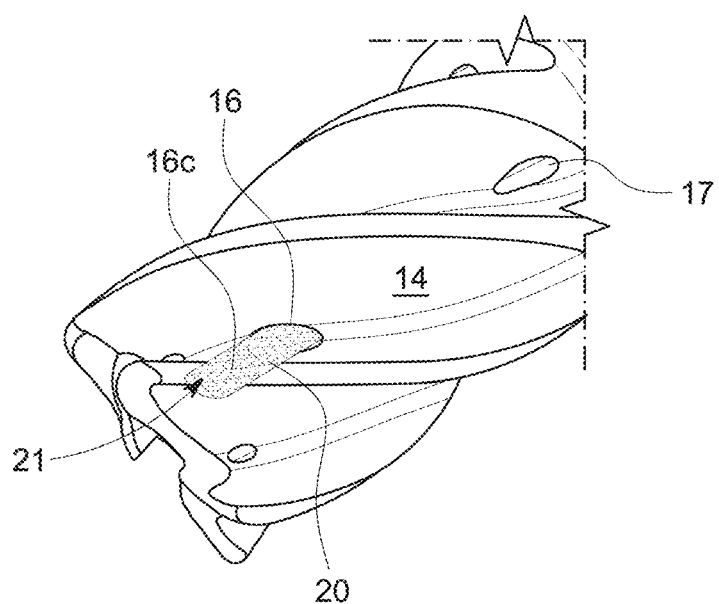
FIG. 5 illustrates a projection of an exit aperture of a second set of internal coolant channels intersecting a rake face below a radial cutting edge of the rotary cutting tool according to some embodiments.

A second set of internal coolant channels 16a are associated with exit apertures 16. A projection 16c of an exit aperture 16 of the second set of internal coolant channels 16a intersects a rake face 20 below a radial cutting edge 21 of the rotary cutting tool 10. FIG. 5 illustrates the projection 16c of the exit aperture 16 intersecting a rake face 20 below a radial cutting edge 21 of the rotary cutting tool 10. In the embodiment of FIG. 5, the rake face 20 intersected by the projection 16c is adjacent to the corner edge 19. In some embodiments, each exit aperture 16 of the second set of internal coolant channels 16a has a projection 16c intersecting a rake face 20 below a radial cutting edge 21 of the rotary cutting tool 10.

Figure 6:
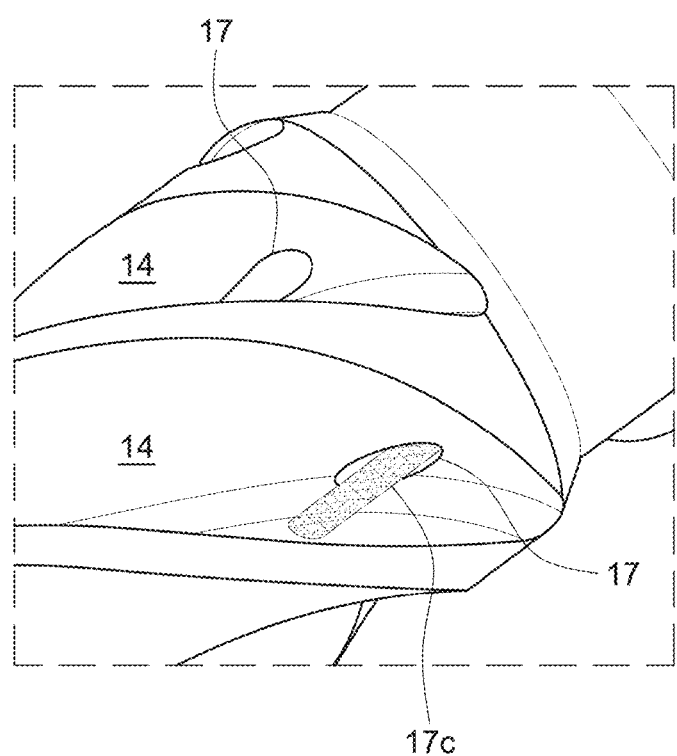
FIG. 6 illustrates a projection of an exit aperture of a third set of internal coolant channels parallel or substantially parallel to the longitudinal axis of the rotary cutting tool according to some embodiments.

In some embodiments, the rotary cutting tool further comprises a third set of internal coolant channels 17a associated with exit apertures 17. A projection 17c of an exit aperture 17 of the third set of internal coolant channels is parallel or substantially parallel with the longitudinal axis 13 of the rotary cutting tool 10. FIG. 6 illustrates a projection 17c of an exit aperture 17 parallel or substantially parallel to the longitudinal axis 13 of the rotary cutting tool 10. In the embodiment of FIG. 6, the exit apertures 17 of the third set of internal coolant channels 17a are located adjacent to the shank portion 11 of the cutting tool 10. In embodiments wherein the projection 17c of an exit aperture 17 is substantially parallel, the projection 17c can form an angle of 0.1-10 degrees with the longitudinal axis 13 of the rotary cutting tool 10.

It is contemplated that the sets of internal coolant channels and associated coolant exit apertures can be moved to various positions along the longitudinal axis of the cutting tool as long as the coolant exit axes maintain the intersection points described herein. In some embodiments, each exit aperture 17 of the third set of internal coolant channels 17a has a projection 17c parallel or substantially parallel with the longitudinal axis 13 of the rotary cutting tool 10.

As illustrated in the figures, the exit apertures of the internal coolant flow channels have differing geometries. Geometry of the exit apertures can be selected according to several considerations including, but not limited to, the amount of coolant provided by the flow channels, area of the cutting tool to be wetted by the coolant, desired geometry of the coolant stream, and desired coolant discharge pressure. The exit apertures 15 of the first set of internal coolant channels 15a, for example, exhibit a relatively small diameter for directing the coolant to the rake face 18 extending below a corner edge 19 of the rotary cutting tool 10. In this way, the coolant travels along the projection 15c to strike the rake face 18 and may flow over the corner edge 19. The small exit diameter of exit apertures 15 also generate higher coolant discharge pressure relative to the coolant exit apertures 16, 17 of the second 16a and third 17a sets of internal coolant channels.

The exit apertures 16 of the second set of internal coolant channels 16a present a different geometry for wetting a rake face and associated radial cutting edge. As illustrated in the figures, exit apertures 16 exhibit a slot-like geometry with a wide diameter in one dimension and a shorter diameter normal to the wide diameter. This geometry can efficiently provide coolant to the radial cutting edge 21 and rake face 20 extending below the radial cutting edge 21. The long, and narrow dimensions of the exit apertures 16 provide sufficient coolant discharge pressure. However, the coolant discharge pressure is lower relative to the exit apertures 15 of the first set of internal coolant channels 15a.

Further, the exit apertures 17 of the third set of internal coolant channels 17a present a geometry suitable for wetting flute surfaces with coolant. In some embodiments, geometry of the exit apertures 17 is sufficient to wet the entire flute surface. In the embodiments illustrated in the figures, coolant exit apertures 17 of the third set of internal coolant channels 17a are located adjacent to the shank portion 11 of the rotary cutting tool 10. In this way, coolant exits the apertures 17 and flows along the valley of the flutes 14. Flow of the coolant over flute surfaces can be aided by gravity as the third set of internal fluid channels 17a terminate in an exit aperture 17 having a projection 17c parallel or substantially parallel the longitudinal axis 13 of the rotary cutting tool. Accordingly, the exit apertures 17 can have lower coolant discharge pressure relative to the exit apertures 15 of the first set of internal coolant channels 15a, for example.

As described herein, exit apertures 15, 16, 17 of the sets of internal coolant channels 15a, 16a, 17a are located in flutes 14 of the rotary cutting tool 10. The exit apertures can have any location in the flutes consistent with delivering coolant to the respective regions of the rotary cutting tool as described herein. In some embodiments, for example, the exit apertures 15, 16, 17 are positioned at the base of the flutes. In some embodiments, exit apertures 15, 16, 17 of the sets of internal coolant channels 15a, 16a, 17a are located in each of the flutes 14 of the rotary cutting tool 10.

The combination of the three sets of coolant channels and associated exit aperture placement and geometries provide effective cooling of the rotary cutting tool during cutting operations with substantially less coolant consumption. The first set of coolant channels 15a, for example, target corner nose regions while the second set of coolant channels 16a target radial cutting edges. Moreover, the third set of coolant channels 17a function to wet substantially all flute surfaces, in some embodiments.

In some embodiments, the sets of internal coolant channels extend radially from a central internal coolant channel of the rotary cutting tool. The sets of internal coolant channels can extend radially to their associated exit apertures in any desired manner. In some embodiments, at least one of the sets of internal coolant channels extend linearly from the central coolant channel to the coolant exit apertures. In other embodiments, at least one of the sets of internal coolant channels comprises one or more curved sections when extending radially to the exit apertures.

Each set of internal coolant channels can receive coolant from the central internal coolant channel. The central internal coolant channel can have any geometry and/or dimensions consistent with supplying sufficient coolant to the sets of internal coolant channels. In some embodiments, the central internal coolant channel comprises one or more tapered and/or curved sections. Additionally, in some embodiments, the central internal coolant channel extends through the shank portion of the rotary cutting tool. Referring to FIG. 2, the sets of internal coolant channels 15a, 16a, 17a extend radially from a central internal coolant channel 23. The first and second sets 15a, 16a of internal coolant channels radially extend in a generally linear fashion. The third set of internal coolant channels 17a employ a curved section to align the coolant exit aperture with the longitudinal axis 13 of rotary cutting tool 10. Alternatively, in some embodiments, the sets of internal coolant channels 15a, 16a, 17a are independent of one another and are not connected to a central internal coolant channel.

Rotary cutting tools of the present application can be fabricated by any technique enabling the technical and structural features described herein. In some embodiments, a rotary cutting tool is fabricated by one or more additive manufacturing techniques. Additive manufacturing techniques contemplated herein include, but are not limited to, binder jetting, material jetting, laser powder bed, electron beam powder bed and directed energy deposition as described in ASTM F-42. Additionally, the rotary cutting tool can be fabricated from any desired material. Material of the rotary cutting tool can be selected according to several considerations including, but not limited to, specific design of the tool, clamping requirements of the tool holder apparatus, material of the tool holder body and/or compatibility with fabrication techniques, including additive manufacturing techniques. The rotary cutting tool, in some embodiments, is fabricated from the same material as the tool holder body. In other embodiments, the rotary cutting tool and tool holder body are comprise different materials. For example, the rotary cutting tool can be constructed of material(s) having low thermal conductivity, which can reduce heat transfer to the chambers and prevent the fluid, such as hydraulic fluid, organic fluid or silicone fluid, from overheating during cutting operations. In some embodiments, the rotary cutting tool is fabricated from steel, such as tool steel. In other embodiments, the rotary cutting tool is fabricated from cobalt-based alloy, nickel-based alloy or various iron-based alloys. Alternatively, the rotary cutting tool can be fabricated from solid carbide, including sintered cemented carbide, such as tungsten carbide with an iron-group binder. In some embodiments, the rotary cutting tool is fabricated via additive manufacturing from carbide powder compositions described in U.S. patent application Ser. No. 15/437,153, which is incorporated herein by reference in its entirety. Rotary cutting tools having design, structure, and properties described herein include end mills and drills.

II. Methods of Cutting a Workpiece

In another aspect, methods of cutting a workpiece are described herein. In some embodiments, a method comprises providing a rotary cutting tool comprising a shank portion, and a cutting portion extending from the shank portion along a longitudinal axis, the cutting portion comprising flutes helically extending along the longitudinal axis and internal coolant channels comprising exit apertures in the flutes, and contacting the workpiece with the rotary cutting tool. Coolant is discharged from a first set of coolant channels to strike a rake face below a corner edge of the rotary cutting tool, and coolant is also discharged from a second set of internal coolant channels to strike a rake face below a radial cutting edge of the rotary cutting tool. In some embodiments, coolant is additionally discharged from a third set of internal coolant channels along the longitudinal axis of the rotary cutting tool.

Rotary cutting tools of methods described herein can have any design, structure, and/or properties described in Section I above and illustrated in the referenced figures.

Various embodiments of the invention have been described in fulfillment of the various objectives of the invention. It should be recognized that these embodiments are merely illustrative of the principles of the present invention. Numerous modifications and adaptations thereof will be readily apparent to those skilled in the art without departing from the spirit and scope of the invention.

The invention claimed is:

1. A rotary cutting tool comprising:
a shank portion; and
a cutting portion extending from the shank portion along a longitudinal axis, the cutting portion comprising flutes helically extending along the longitudinal axis and internal coolant channels comprising exit apertures in the flutes, wherein a projection of an exit aperture of a first set of internal coolant channels intersects a rake face extending below a corner edge of the rotary cutting tool, and a projection of an exit aperture of a second set of internal coolant channels intersects a rake face adjacent to the corner edge below a radial cutting edge of the rotary cutting tool.

2. The rotary cutting tool of claim 1 further comprising a third set of internal coolant channels, wherein a projection of an exit aperture of the third set of internal coolant channels is parallel or substantially parallel with the longitudinal axis.

3. The rotary cutting tool of claim 2, wherein the exit apertures of the second set of internal coolant channels reside between the exit apertures of the first and third sets of internal coolant channels along the longitudinal axis.

4. The rotary cutting tool of claim 2, wherein the exit apertures of the third set of coolant channels are proximate the shank portion.

5. The rotary cutting tool of claim 1, wherein the exit apertures for the first and second sets of internal coolant channels differ in shape.

6. The rotary cutting tool of claim 2, wherein the exit apertures for the first, second, and third sets of internal coolant channels differ from one another in shape.

7. The rotary cutting tool of claim 2, wherein the first, second, and third sets of internal coolant channels extend radially from a central internal coolant channel.

8. The rotary cutting tool of claim 1, wherein the exit apertures of the first and second sets of internal coolant channels are positioned at a base of the flutes.

9. The rotary cutting tool of claim 2, wherein the exit apertures of the first, second, and third sets of internal coolant channels are positioned at a base of the flutes.

10. The rotary cutting tool of claim 7, wherein the central internal coolant channel extends through the shank portion.

11. The rotary cutting tool of claim 7, wherein the central internal coolant channel comprises one or more tapered sections.

12. The rotary cutting tool of claim 2, wherein at least one of the first, second, and third sets of internal coolant channels comprise a curved section.

13. The rotary cutting tool of claim 2, wherein at least one of the first, second, and third sets of internal coolant channels are linear.

14. The rotary cutting tool of claim 1, wherein the first and second sets of internal coolant channels exhibit differing coolant discharge pressures.

15. The rotary cutting tool of claim 2, wherein the first, second and third sets of internal coolant channels exhibit differing coolant discharge pressures.

16. The rotary cutting tool of claim 15, wherein the first set of coolant channels exhibit the highest coolant discharge pressure.

17. The rotary cutting tool of claim 1, wherein the rotary cutting tool is an end mill.

18. The rotary cutting tool of claim 1, wherein the rotary cutting tool is fabricated by an additive manufacturing method.

19. The rotary cutting tool of claim 1, wherein the rotary cutting tool is formed of sintered cemented carbide.

20. A method of cutting a workpiece comprising:
 providing a rotary cutting tool comprising a shank portion, and a cutting portion extending from the shank portion along a longitudinal axis, the cutting portion comprising flutes helically extending along the longitudinal axis and internal coolant channels comprising exit apertures in the flutes; wherein a projection of an exit aperture of a first set of internal coolant channels intersects a rake face extending below a corner edge of the rotary cutting tool, and a projection of an exit aperture of a second set of internal coolant channels intersects a rake face below a radial cutting edge of the rotary cutting tool;
 contacting the workpiece with the rotary cutting tool, wherein a projection of an exit aperture of a first set of internal coolant channels intersects a rake face extending below a corner edge of the rotary cutting tool, and a projection of an exit aperture of a second set of internal coolant channels intersects a rake face adjacent to the corner edge below a radial cutting edge of the rotary cutting tool;
 discharging coolant from a first set of internal coolant channels to strike a rake face below a corner edge of the rotary cutting tool; and
 discharging coolant from a second set of internal coolant channels to strike a rake face adjacent to the corner edge below a radial cutting edge of the rotary cutting tool.

21. The method of claim 20 further comprising discharging coolant from a third set of internal coolant channels along the longitudinal axis of the rotary cutting tool.

22. The method of claim 21, wherein the exit apertures for the first, second, and third sets of internal coolant channels differ from one another.

23. The method of claim 21, wherein the exit apertures of the first, second, and third sets of internal coolant channels are positioned at a base of the flutes.

24. The method of claim 21, wherein the coolant is discharged from the first, second and third sets of internal coolant channels at differing pressures.

* * * * *